(12) United States Patent
Sandberg et al.

(10) Patent No.: US 10,900,998 B1
(45) Date of Patent: Jan. 26, 2021

(54) CONTACTLESS SCREENING OF A QUBIT

(71) Applicant: International Business Machines Corporation, Armonk, NY (US)

(72) Inventors: Martin O. Sandberg, Ossining, NY (US); Vivekananda P. Adiga, Ossining, NY (US); Hanhee Paik, Danbury, CT (US); Jared Barney Hertzberg, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/687,143

(22) Filed: Nov. 18, 2019

(51) Int. Cl.
*G06N 10/00* (2019.01)
*G01Q 60/00* (2010.01)

(52) U.S. Cl.
CPC ............. *G01Q 60/00* (2013.01); *G06N 10/00* (2019.01)

(58) Field of Classification Search
CPC ......... G06N 10/00; G01G 60/00; G01R 23/00
See application file for complete search history.

(56) References Cited

U.S. PATENT DOCUMENTS

| | | | |
|---|---|---|---|
| 6,987,282 B2 | 1/2006 | Amin et al. | |
| 7,230,266 B2 | 6/2007 | Hilton et al. | |
| 8,508,280 B2* | 8/2013 | Naaman | H03K 3/38 327/367 |
| 9,224,099 B2 | 12/2015 | Koizumi | |
| 10,068,180 B2 | 9/2018 | Amin et al. | |
| 10,096,376 B2 | 10/2018 | Benjamin et al. | |
| 2009/0289638 A1* | 11/2009 | Farinelli | G06N 10/00 324/652 |
| 2016/0125309 A1* | 5/2016 | Naaman | G06N 10/00 326/3 |
| 2017/0193388 A1* | 7/2017 | Filipp | G06F 15/82 |
| 2018/0003753 A1 | 1/2018 | Bishop et al. | |
| 2018/0240033 A1* | 8/2018 | Leek | G06N 10/00 |

(Continued)

FOREIGN PATENT DOCUMENTS

WO 2004102470 A2 11/2004

OTHER PUBLICATIONS

Krantz, Philip, et al. "Single-shot read-out of a superconducting qubit using a Josephson parametric oscillator." Nature communications 7.1 (2016): 1-8. (Year: 2016).*

(Continued)

*Primary Examiner* — Wyatt A Stoffa
(74) *Attorney, Agent, or Firm* — Amin, Turocy & Watson, LLP

(57) ABSTRACT

Systems, devices, computer-implemented methods, and computer program products to facilitate contactless screening of a qubit are provided. According to an embodiment, a system can comprise a memory that stores computer executable components and a processor that executes the computer executable components stored in the memory. The computer executable components can comprise a scanner component that establishes a direct microwave coupling of a scanning probe device to a qubit of a quantum device. The computer executable components can further comprise a parameter extraction component that determines qubit frequency of the qubit based on the direct microwave coupling.

20 Claims, 10 Drawing Sheets

(56) References Cited

U.S. PATENT DOCUMENTS

2019/0362260 A1* 11/2019 Leek .................. H03K 19/1952
2020/0167684 A1*  5/2020 Frisch ................. H01L 39/025
2020/0235277 A1*  7/2020 Jinka .................. H01L 39/045
2020/0242503 A1*  7/2020 Chen .................. H01L 39/025

OTHER PUBLICATIONS

Peropadre, et al., Tunable coupling engineering between superconducting resonators: From sidebands to effective gauge fields, Physical Review B 87, Apr. 5, 2013, pp. 134504-01-134504-12.
Shanks, et al., A scanning transmon qubit for strong coupling circuit quantum electrodynamics, Mar. 4, 2013, 11 pages.
Graaf, et al., A near-field scanning microwave microscope based on a superconducting resonator for low power measurements, Rev. Sci. Instrum. 84, 023706, Apr. 2, 2014, 7 pages.

* cited by examiner

CONTACTLESS SCREENING OF A QUBIT

BACKGROUND

The subject disclosure relates to screening a qubit to determine its parameters relevant for a quantum processor, and more specifically, to contactless screening of a qubit to determine its parameters relevant for a quantum processor.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate contactless screening of a qubit are described.

According to an embodiment, a system can comprise a memory that stores computer executable components and a processor that executes the computer executable components stored in the memory. The computer executable components can comprise a scanner component that establishes a direct microwave coupling of a scanning probe device to a qubit of a quantum device. The computer executable components can further comprise a parameter extraction component that determines qubit frequency of the qubit based on the direct microwave coupling.

According to an embodiment, a computer-implemented method can comprise establishing, by a system operatively coupled to a processor, a direct microwave coupling of a scanning probe device to a qubit of a quantum device. The computer-implemented method can further comprise determining, by the system, qubit frequency of the qubit based on the direct microwave coupling.

According to an embodiment, a computer program product that can facilitate a contactless screening of a qubit process is provided. The computer program product can comprise a computer readable storage medium having program instructions embodied therewith, the program instructions can be executable by a processing component to cause the processing component to establish, by the processor, a direct microwave coupling of a scanning probe device to a qubit of a quantum device. The program instructions can also cause the processing component to determine, by the processor, qubit frequency of the qubit based on the direct microwave coupling.

DETAILED DESCRIPTION

Figure 1:
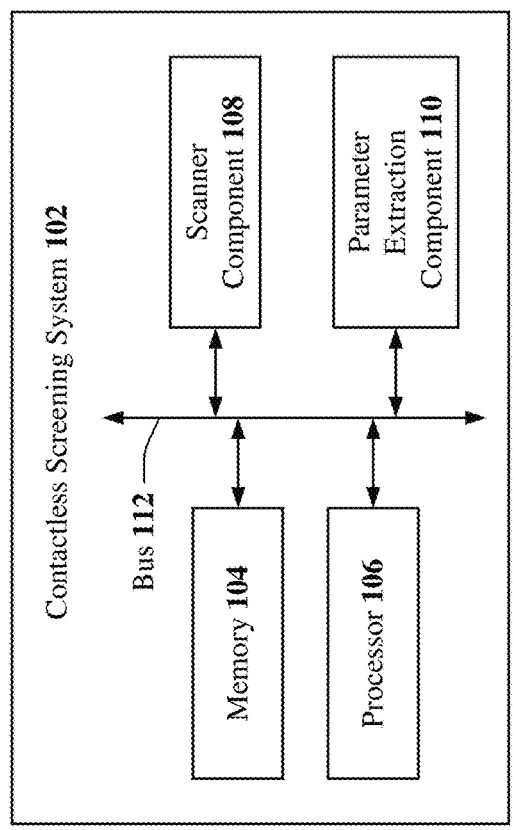
FIG. 1 illustrates a block diagram of an example, non-limiting system that can facilitate contactless screening of a qubit in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Quantum computing has the potential to solve problems that, due to their computational complexity, cannot be solved, either at all or for all practical purposes, on a classical computer. However, quantum computing requires very specialized hardware to, for example, obtain a fully functional quantum processor (e.g., a quantum processor free of frequency collisions). For instance, quantum computing requires very specialized fabrication techniques to obtain a fully functional quantum processor that provides readout data from a quantum chip (full readouts) that accurately reflects the readout data of the individual qubits on the quantum chip.

Existing fixed frequency quantum processors rely on very precise control of the qubit frequency. The uncertainty in qubit frequency is primarily a consequence of uncertainty in the Josephson junction fabrication, and the resulting critical current. Today even modestly small quantum processors of 10's of qubits have only a very small statistical chance to be frequency collision free.

To have a better chance of obtaining a fully functional quantum processor, the qubits are individually screened (also referred to as scanned, probed, inspected, etc.). Today that screening relies on direct measurements of the Josephson junction resistance. The resistance can then be related back to the critical current of the Josephson junction, where the critical current is the current in the junction below which the material of the junction is superconducting, at a certain temperature and without the presence of an external magnetic field.

However, the relation between the resistance and the critical current can be obscured by leakage currents in, for example, substrates of the quantum processor comprising the qubits. Currently, qubits are screened, then actually measured in a cryostat, fully packaged to find the exact relation for each processor chip.

A problem with existing qubit screening technologies is that they do not provide a non-invasive approach (e.g., contactless) to extract (e.g., obtain) one or more qubit parameters of a qubit in a quantum processor prior to packaging (e.g., prior to bump bonding) and/or while in a cryostat. For example, such existing qubit screening technologies do not provide a contactless approach to obtain qubit frequency and/or qubit energy relaxation time of a qubit in a quantum processor prior to packaging and/or while in a cryostat.

FIG. 1 illustrates a block diagram of an example, non-limiting system 100 that can facilitate contactless screening of a qubit in accordance with one or more embodiments described herein. System 100 can comprise a contactless screening system 102. Contactless screening system 102 can comprise a memory 104, a processor 106, a scanner component 108, a parameter extraction component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or contactless screening system 102 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to contactless screening system 102, scanner component 108, parameter extraction component 110, and/or another component associated with contactless screening system 102 (e.g., position component 202, etc.), as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 1014 and FIG. 10. Such examples of processor 106 can be employed to implement any embodiments of the subject disclosure.

Contactless screening system 102, memory 104, processor 106, scanner component 108, parameter extraction component 110, and/or another component of contactless screening system 102 as described herein can be communicatively, electrically, operatively, and/or optically coupled to one another via a bus 112 to perform functions of system 100, contactless screening system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 1018 and FIG. 10. Such examples of bus 112 can be employed to implement any embodiments of the subject disclosure.

Contactless screening system 102 can comprise any type of component, machine, device, facility, apparatus, and/or instrument that comprises a processor and/or can be capable of effective and/or operative communication with a wired and/or wireless network. All such embodiments are envisioned. For example, contactless screening system 102 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Contactless screening system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, contactless screening system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, contactless screening system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, contactless screening system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between contactless screening system 102 and external systems, sources, and/or devices (e.g., computing devices, communication devices, etc.).

Contactless screening system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with contactless screening system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, scanner component 108, parameter extraction component 110, and/or any other components associated with contactless screening system 102 as disclosed herein (e.g., communicatively, electronically, operatively, and/or optically coupled with and/or employed by contactless screening system 102), can comprise such computer and/or machine readable, writable, and/or executable component(s) and/or instruction(s). Consequently, according to numerous embodiments, contactless screening system 102 and/or any components associated therewith as disclosed herein, can employ processor 106 to execute such computer and/or machine readable, writable, and/or executable component(s) and/or instruction(s) to facilitate performance of one or more operations described herein with reference to contactless screening system 102 and/or any such components associated therewith.

Contactless screening system 102 can facilitate performance of operations executed by and/or associated with scanner component 108, parameter extraction component 110, and/or another component associated with contactless screening system 102 as disclosed herein (e.g., position component 202, etc.). For example, as described in detail below, contactless screening system 102 can facilitate via processor 106: establishing a direct microwave coupling of a scanning probe device to a qubit of a quantum device; and/or determining qubit frequency of the qubit based on the direct microwave coupling.

In another example, contactless screening system 102 can further facilitate via processor 106: coupling a microwave resonator of the scanning probe device directly to the qubit using at least one of capacitive coupling or inductive coupling; determining qubit energy relaxation time of the qubit based on the direct microwave coupling; determining at least one of the qubit frequency or qubit energy relaxation time of the qubit based on a state dependent frequency shift of a microwave resonator of the scanning probe device; inserting multiple scanning probe devices and the quantum device into a cryostat device, establishing inside the cryostat device multiple direct microwave couplings of the multiple scanning probe devices to multiple qubits of the quantum device, and determining at least one of qubit frequencies or qubit energy relaxation times of the multiple qubits based on the multiple direct microwave couplings; positioning the scanning probe device a defined distance from the qubit to establish the direct microwave coupling of the scanning probe device to the qubit; and/or inserting the scanning probe device and the quantum device into a cryostat device and establishing inside the cryostat device the direct microwave coupling of the scanning probe device to the qubit to inspect the qubit, thereby facilitating reduced time to extract the qubit frequency.

Scanner component 108 can employ a scanning probe device to readout a qubit of a quantum device (e.g., a quantum processor) without causing the scanning probe device to contact the qubit or the quantum device. For example, scanner component 108 can employ a scanning probe device that is external to a qubit and/or a quantum circuit (e.g., not integrated in and/or fabricated with the qubit and/or the quantum device) to readout a qubit (e.g., using a dispersive readout technique) without causing the scanning probe device to contact the qubit or the quantum device. For instance, scanner component 108 can employ an external scanning probe device such as, for example, scanning probe device 306 described below and illustrated in FIG. 3 to readout a qubit 304 of a quantum device 302 without causing scanning probe device 306 to contact qubit 304 or quantum device 302.

To facilitate such non-invasive (e.g., contactless) readout (e.g., dispersive readout) of a qubit as described above, scanner component 108 can establish a direct microwave coupling of a scanning probe device to a qubit of a quantum device. For example, scanner component 108 can establish a direct capacitive and/or inductive coupling (e.g., via a microwave field) of a scanning probe device to a qubit of a quantum device (e.g., a quantum circuit, a quantum chip, a wafer comprising one or more quantum chips, a quantum processor, etc.). For instance, scanner component 108 can capacitively and/or inductively couple a resonator of a scanning probe device directly to a qubit of a quantum device, where such resonator can comprise a readout resonator that can be coupled (e.g., communicatively, electrically, operatively, optically, physically, etc.) to the scanning probe device. Examples of such a resonator can include, but are not limited to a microwave resonator, a readout resonator, a transmission line resonator (e.g., λ/2 transmission line resonator, 214 transmission line resonator), a single mode resonator, a multi-mode resonator, and/or another resonator.

Figure 4:
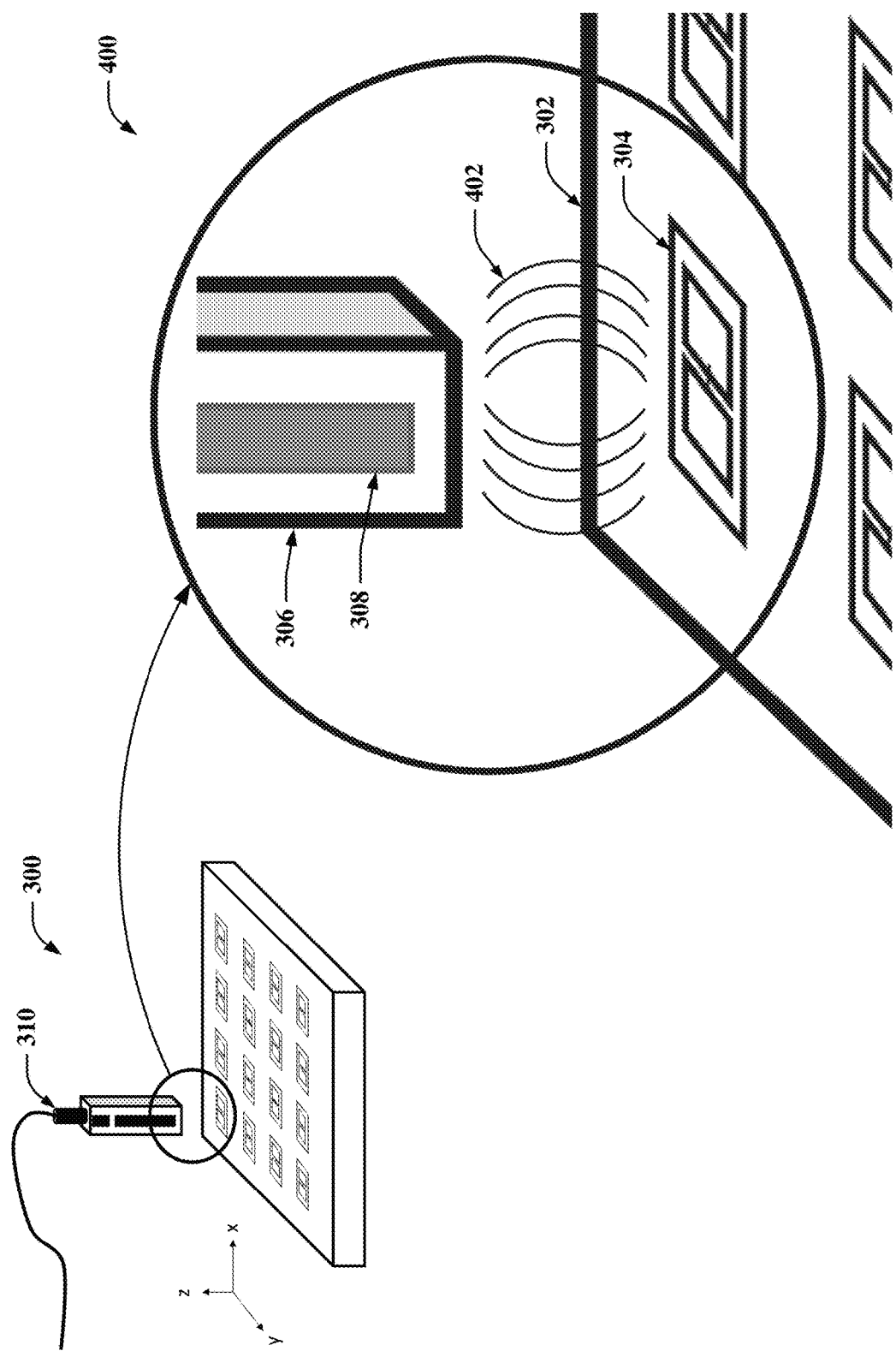
FIG. 4 illustrates a diagram of an example, non-limiting system that can facilitate contactless screening of a qubit in accordance with one or more embodiments described herein.

Scanner component 108 can establish a direct microwave coupling of a scanning probe device to a qubit of a quantum device without causing the scanning probe device to contact the qubit or the quantum device. For example, scanner component 108 can facilitate generation of an electric field at an end (e.g., a distal end) of a scanning probe device that interacts with the qubit, thereby enabling non-invasive (e.g., contactless) direct microwave coupling (e.g., capacitive and/or inductive coupling via a microwave field) of the scanning probe device (e.g., a resonator of a scanning probe device) to the qubit. For instance, scanner component 108 can facilitate generation of an electric field 402 (e.g., via a network analyzer as described below) at a distal end of scanning probe device 306 that interacts with qubit 304 as illustrated in FIG. 4, thereby enabling non-invasive (e.g., contactless) direct microwave coupling (e.g., capacitive and/or inductive coupling) of microwave resonator 308 to qubit 304.

Scanner component 108 can establish a direct microwave coupling of a scanning probe device to a qubit of a quantum device without using an intermediate component between the scanning probe device and the qubit or the quantum circuit to facilitate such coupling. For example, scanner component 108 can capacitively and/or inductively couple a resonator of a scanning probe device directly to a qubit of a quantum device without using an intermediate component integrated in and/or fabricated with the qubit or the quantum device to facilitate such coupling. For instance, scanner component 108 can capacitively and/or inductively couple a resonator of a scanning probe device directly to a qubit of a quantum device without using a transmission line, an electrode, a wire, a contact pad, and/or another intermediate component integrated in and/or fabricated with the qubit or the quantum device to facilitate such coupling.

To facilitate generation of such electric field and/or establishing a direct microwave coupling of a scanning probe device to a qubit as described above, scanner component 108 can employ a network analyzer (e.g., a vector network analyzer (VNA)) that can transmit signals to and/or through a resonator (e.g., microwave resonator) of the scanning probe device, where such signals can be reflected by the qubit back to the resonator to detect a response. For example, scanner component 108 can employ a VNA that can transmit signals to and/or through a microwave resonator of the scanning probe device, where such signals can comprise microwave spectroscopy signals that can be reflected by the qubit back to the microwave resonator to detect a response (e.g., to detect a shift of a state dependent frequency of the microwave resonator that can be indicative of the qubit frequency). For instance, if the qubit is resonant with a microwave spectroscopy signal, and the scanning probe device is within a defined distance from the qubit (e.g., approximately 300 microns), a response can be detected. Based on such a response, parameter extraction component 110 can determine one or more parameters of the qubit as described below.

Parameter extraction component 110 can determine qubit frequency and/or qubit relaxation time of a qubit based on a direct microwave coupling of an external scanning probe device with the qubit. For example, based on such direct microwave coupling of a resonator in a scanning probe device to a qubit that can be established by scanner component 108 as described above, parameter extraction component 110 can determine the qubit frequency and/or the qubit energy relaxation time.

To facilitate such determination of the qubit frequency, parameter extraction component 110 can employ scanner component 108 and/or a VNA to perform a qubit spectroscopy technique (e.g., Ramsey experiment, Ramsey fringes, Ramsey measurements, etc.) to detect a shift of a state dependent frequency of a microwave resonator of the scanning probe device described above (e.g., to detect qubit energy transitions, qubit anharmonicity, etc.). For instance, parameter extraction component 110 can employ scanner component 108 and/or a VNA to simultaneously apply to and/or through the microwave resonator a resonance tone (also referred to as a harmonic, mode, channel, etc.) at the resonant frequency of the microwave resonator and a second tone at a certain frequency to excite (e.g., stimulate) the qubit. In this example, parameter extraction component 110 can further employ scanner component 108 and/or a VNA to read out responses (e.g., dispersive readouts) of the microwave resonator and/or the qubit, where a response by the qubit to the second tone at the certain frequency can change the response on the resonance tone (e.g., a change (e.g., a dip) in the transmission spectra corresponding to the microwave resonator). Such a change to the response on the resonance tone can indicate a shift in the state dependent frequency of the microwave resonator that enables parameter extraction component 110 to determine the qubit frequency.

To facilitate such determination of qubit energy relaxation time, parameter extraction component 110 can employ a qubit measurement system to apply microwave pulses both for qubit operation and qubit state readout. For example, parameter extraction component 110 can employ a qubit measurement system comprising microwave signal generators and can further employ methods of up and down conversion of microwave signals (e.g., or direct synthesis of microwave pulses) and analog to digital conversion of the readout signal.

In some embodiments, based on detecting such a shift of the state dependent frequency of the microwave resonator as described above, parameter extraction component 110 can determine the qubit energy relaxation time. For example, the shift in state dependent frequency can be used (e.g., by parameter extraction component 110) to read out the state of the quantum bit (qubit). For instance, by applying a microwave pulse that is close to or on resonance with the microwave resonator (e.g., as measured when the qubit is in its ground state) a deviation in the reflected microwave signal (e.g., either phase or magnitude) indicates that the qubit is in excited state. In this example, by purposely placing the qubit in its excited state and measuring the qubit state as a function of wait time between qubit state preparation and state readout, the energy relaxation time can be extracted (e.g., via parameter extraction component 110).

Figure 2:
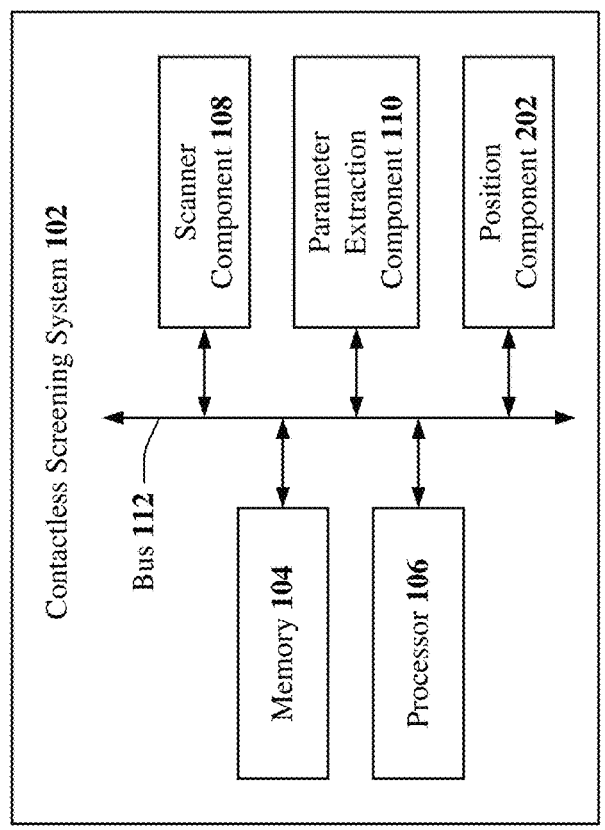
FIG. 2 illustrates a block diagram of an example, non-limiting system that can facilitate contactless screening of a qubit in accordance with one or more embodiments described herein.

FIG. 2 illustrates a block diagram of an example, non-limiting system 200 that can facilitate contactless screening of a qubit in accordance with one or more embodiments described herein. System 200 can comprise contactless screening system 102. In some embodiments, contactless screening system 102 can comprise a position component 202. Repetitive description of like elements and/or processes employed in respective embodiments is omitted for sake of brevity.

Position component 202 can position a scanning probe device a defined distance from a qubit of a quantum circuit to establish a direct microwave coupling of the scanning probe device to the qubit. For example, position component 202 can comprise a control component of contactless screening system 102 (not illustrated in the figures) that can facilitate (e.g., via processor 106) movement of one or more components associated with contactless screening system 102 from one physical location to another. For example, position component 202 can comprise a control component of contactless screening system 102 that can position (e.g., physically move) the scanning probe device described above a defined distance from a qubit of a quantum circuit that enables establishing the contactless, non-invasive direct microwave coupling of the scanning probe device to the qubit as described above. For instance, position component 202 can facilitate physical movement of the scanning probe device described above to a defined distance of approximately 300 microns from a qubit of a quantum circuit to enable establishing the contactless, non-invasive direct microwave coupling (e.g., via a microwave field) of the scanning probe device to the qubit as described above.

Position component 202 can position the scanning probe device described above a defined distance from a qubit of a quantum circuit using coordinates (e.g., XYZ coordinates) corresponding to the scanning probe device, the qubit, and/or the quantum circuit. In this example, such coordinates can be input to the position component 202 by an entity (e.g., a human, a computing device, a software application, an expert agent, a machine learning (ML) model, an artificial intelligence (AI) model, etc.) using an interface component of contactless screening system 102 (e.g., a graphical user interface (GUI), etc.).

In another example, such a scanning probe device described above can be mounted to stage (e.g., coupled to a positioning stage communicatively, electrically, operatively, optically, physically, etc.) and position component 202 can control movement (e.g., via processor 106) of the scanning probe device and/or the stage to position the scanning probe device to a defined distance from a qubit of a quantum circuit (e.g., using coordinates of a positioning stage coordinate system). For instance, such a scanning probe device described above can be mounted to an XYZ piezo stage (e.g., physically coupled to an XYZ piezo stage) and position component 202 can control movement of the scanning probe device and/or the XYZ piezo stage to position the scanning probe device to a defined distance from a qubit of a quantum circuit.

Figure 3:
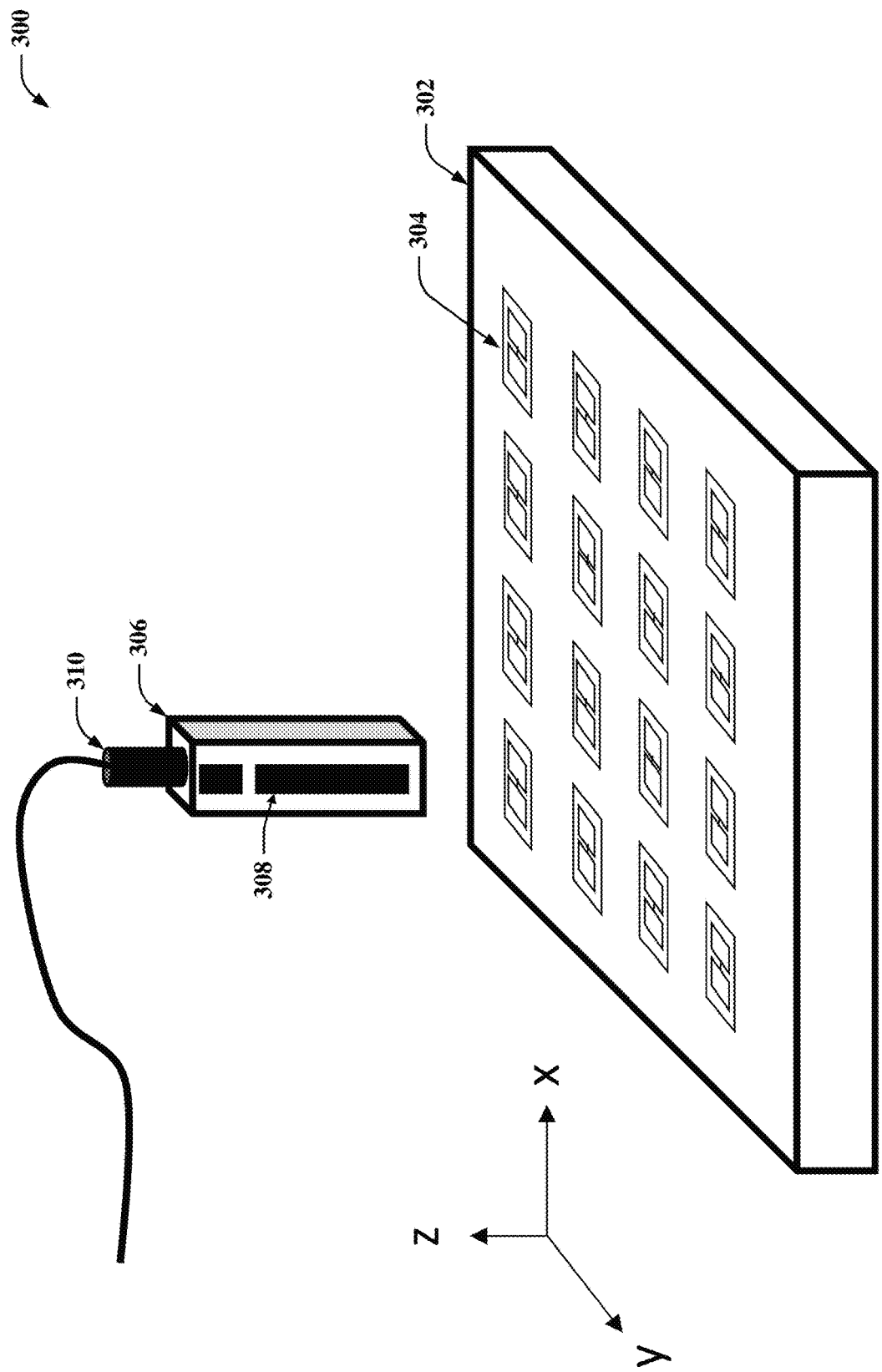
FIG. 3 illustrates a diagram of an example, non-limiting system that can facilitate contactless screening of a qubit in accordance with one or more embodiments described herein.

FIG. 3 illustrates a diagram of an example, non-limiting system 300 that can facilitate contactless screening of a qubit in accordance with one or more embodiments described herein. Repetitive description of like elements and/or processes employed in respective embodiments is omitted for sake of brevity.

System 300 can comprise a quantum device 302. Quantum device 302 can comprise a quantum device including, but not limited to, a quantum computing device, a quantum computer, a quantum processor, quantum hardware, a superconducting and/or quantum circuit, a wafer comprising one or more quantum processor chips, a wafer comprising one or more superconducting and/or quantum circuits, a chip comprising one or more quantum processors (e.g., flip chipped quantum processor), a chip comprising one or more superconducting and/or quantum circuits, and/or another type of quantum device. Quantum device 302 can comprise one or more qubits 304 (also referred to herein as qubit 304 or qubits 304). In some embodiments, such one or more qubits 304 can respectively comprise a Josephson junction and capacitor pads.

System 300 can further comprise a scanning probe device 306. Scanning probe device 306 can comprise a microwave resonator 308 and/or a microwave connector 310. In some embodiments, scanning probe device 306 can comprise the scanning probe device described above with reference to FIGS. 1 and 2 that can be employed by scanner component 108 and/or parameter extraction component 110 to enable execution of one or more operations that can be facilitated and/or performed by such component(s).

Microwave resonator 308 can comprise a readout resonator that can be coupled (e.g., communicatively, electrically, operatively, optically, physically, etc.) to scanning probe device 306. For example, microwave resonator 308 can comprise a resonator including, but not limited to a microwave resonator, a readout resonator, a transmission line resonator (e.g., $\lambda/2$ transmission line resonator, $\lambda/4$ transmission line resonator), a single mode resonator, a multi-mode resonator, and/or another resonator.

In another example, scanning probe device 306 can comprise a dielectric material and microwave resonator 308 can comprise a microstrip and/or stripline that can be integrated into such dielectric material using one or more techniques and/or processes that enable fabrication of a semiconductor and/or superconductor device. For example, fabrication of scanning probe device 306 can comprise one or more multi-step sequences of, for instance, photolithographic and/or chemical processing steps that facilitate gradual creation of electronic-based systems, devices, components, and/or circuits in a semiconducting device. For instance, scanning probe device 306 can be fabricated by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), physical vapor deposition (PVD), chemical vapor deposition (CVD), atomic layer deposition (ALD), plasma enhanced chemical vapor deposition (PECVD), chemical solution deposition, electroplating, molecular beam epitaxy (MBE), electrochemical deposition (ECD), lift-off techniques, chemical-mechanical planarization (CMP), backgrinding techniques, and/or another technique for fabricating an integrated circuit in dielectric material (e.g., for integrating microwave resonator 308 into scanning probe device 306).

In some embodiments (not illustrated in the figures), scanning probe device 306 can comprise only a coaxial cable. In some embodiments (not illustrated in the figures), scanning probe device 306 can be mounted to a stage (e.g., coupled to an XYZ piezo stage communicatively, electrically, operatively, optically, physically, etc.) that can be controlled by position component 202 as described above to position scanning probe device 306 at a defined distance (e.g., approximately 300 microns) from qubit 304.

Microwave connector 310 can comprise a coaxial cable. In some embodiments, microwave connector 310 can be coupled (e.g., communicatively, electrically, operatively, optically, physically, etc.) to scanning probe device 306 at one end (e.g., at a distal end of scanning probe device 306 and/or microwave connector 310 as illustrated in FIG. 3). In some embodiments (not illustrated in the figures), microwave connector 310 can be further coupled (e.g., communicatively, electrically, operatively, optically, physically, etc.) to scanner component 108, parameter extraction component 110, and/or a VNA at another end (e.g., at a distal end of microwave connector 310) to enable execution of one or more operations described above that can be facilitated and/or performed by one or more of such components.

FIG. 4 illustrates a diagram of an example, non-limiting system 400 that can facilitate contactless screening of a qubit in accordance with one or more embodiments described herein. Repetitive description of like elements and/or processes employed in respective embodiments is omitted for sake of brevity.

System 400 can comprise system 300, where system 400 can comprise an example illustration of electric field 402 (e.g., a microwave field) that can be generated between scanning probe device 306 and qubit 304 as described above. For example, electric field 402 can comprise an example illustration of the contactless, non-invasive direct capacitive coupling and/or inductive coupling that can be established by scanner component 108 between microwave resonator 308 of scanning probe device 306 and qubit 304 to enable interaction of such components that can facilitate contactless screening of qubit 304 as described above.

Figure 5:
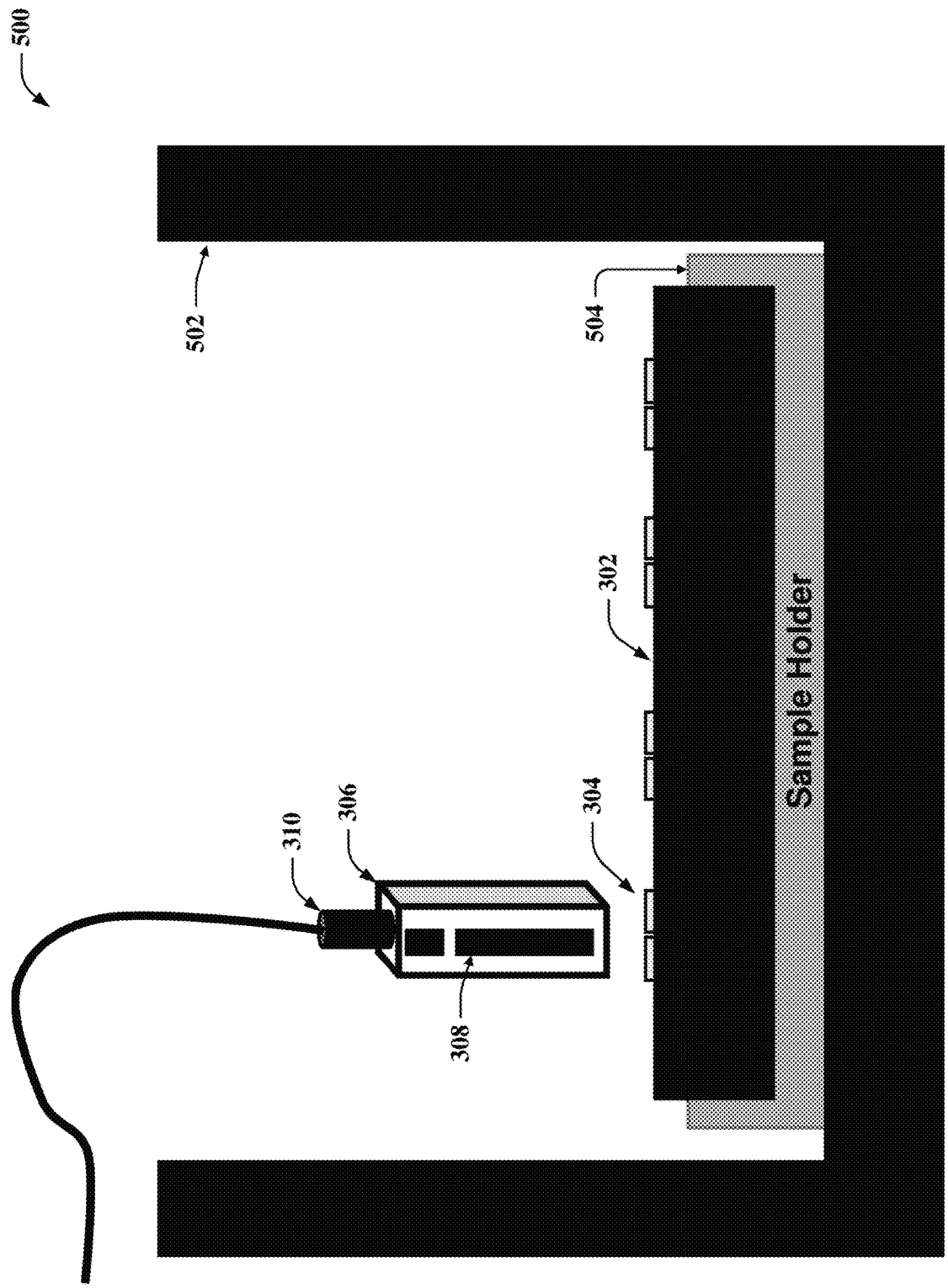
FIG. 5 illustrates a diagram of an example, non-limiting system that can facilitate contactless screening of a qubit in accordance with one or more embodiments described herein.

FIG. 5 illustrates a diagram of an example, non-limiting system 500 that can facilitate contactless screening of a qubit in accordance with one or more embodiments described herein. Repetitive description of like elements and/or processes employed in respective embodiments is omitted for sake of brevity.

System 500 can comprise a cryostat device 502 comprising a sample holder 504. Cryostat device 502 can comprise, for instance, a 100 millikelvin (mK) fast turnaround system and sample holder 504 can comprise a 100 mK sample holder.

As illustrated by system 500 depicted in FIG. 5, cryostat device 502 can comprise quantum device 302 comprising one or more qubits 304. Cryostat device 502 can further comprise scanning probe device 306. In some embodiments, contactless screening system 102 can facilitate insertion of quantum device 302 and/or scanning probe device 306 into cryostat device 502. For example, contactless screening system 102 can employ position component 202 to insert quantum device 302 and/or scanning probe device 306 into cryostat device 502.

Cryostat device 502 can facilitate cooling of quantum device 302, one or more qubits 304, and/or scanning probe device 306 that can be positioned inside cryostat device 502 to enable execution of one or more operations that can be facilitated and/or performed by one or more components of contactless screening system 102 as described in accordance with one or more embodiments of the subject disclosure. For example, cryostat device 502 can facilitate cooling of quantum device 302, one or more qubits 304, and/or scanning probe device 306 that can be positioned inside cryostat device 502 to approximately 100 mK to enable execution of one or more operations that can be facilitated and/or performed by scanner component 108 and/or parameter extraction component 110 as described above with reference to systems 100, 200, 300, and/or 400 and illustrated in FIGS. 1, 2, 3, and/or 4. For instance, cryostat device 502 can facilitate cooling of quantum device 302, one or more qubits 304, and/or scanning probe device 306 positioned inside cryostat device 502 to approximately 100 mK. In some embodiments, such cooling by cryostat device 502 can enable scanner component 108 to establish inside cryostat device 502 the direct microwave coupling of scanning probe device 306 to a qubit 304 to inspect such a qubit 304 as described above (e.g., to determine qubit frequency and/or qubit energy relaxation time via parameter extraction component 110), thereby facilitating reduced time to extract the qubit frequency.

Figure 6:
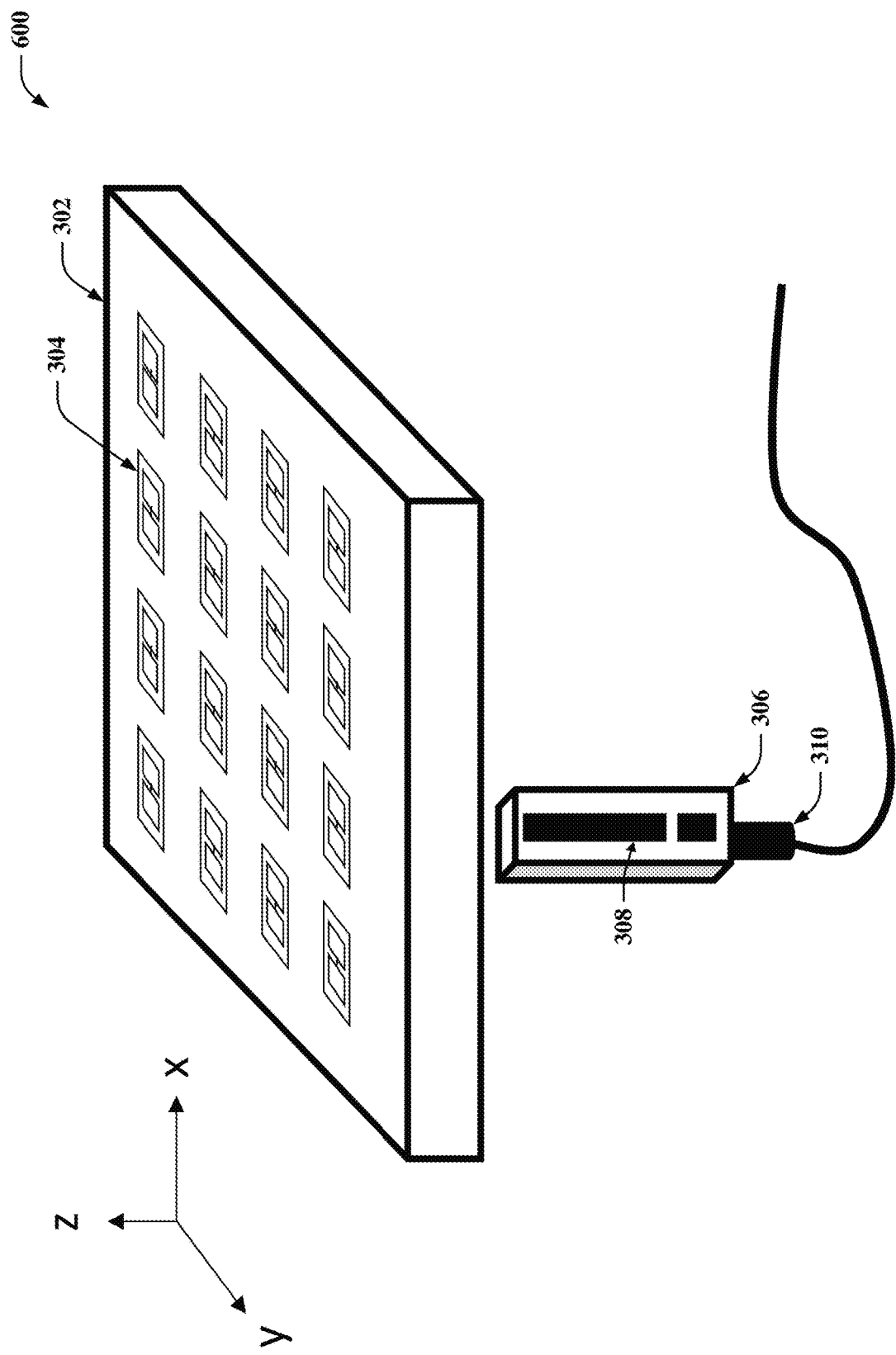
FIG. 6 illustrates a diagram of an example, non-limiting system that can facilitate contactless screening of a qubit in accordance with one or more embodiments described herein.

FIG. 6 illustrates a diagram of an example, non-limiting system 600 that can facilitate contactless screening of a qubit in accordance with one or more embodiments described herein. Repetitive description of like elements and/or processes employed in respective embodiments is omitted for sake of brevity.

System 600 can comprise an example, non-limiting alternative embodiment of system 300, system 400, and/or system 500. For example, system 600 can comprise an illustrative example of how scanning probe device 306 can be implemented using one or more components of contactless screening system 102 (e.g., scanner component 108, parameter extraction component 110, position component 202, etc.) in accordance with one or more embodiments of the subject disclosure described herein to scan (e.g., screen, probe, etc.) one or more qubits 304 of quantum device 302 from a back side of quantum device 302 (e.g., back side of a wafer and/or chip comprising one or more quantum processors). In this example, such scanning of one or more qubits 304 of quantum device 302 can comprise establishing (e.g., via scanner component 108) the direct microwave coupling of scanning probe device 306 to one or more qubits 304 to inspect such qubit(s) 304 as described above (e.g., to determine qubit frequency and/or qubit energy relaxation time via parameter extraction component 110).

Figure 7:
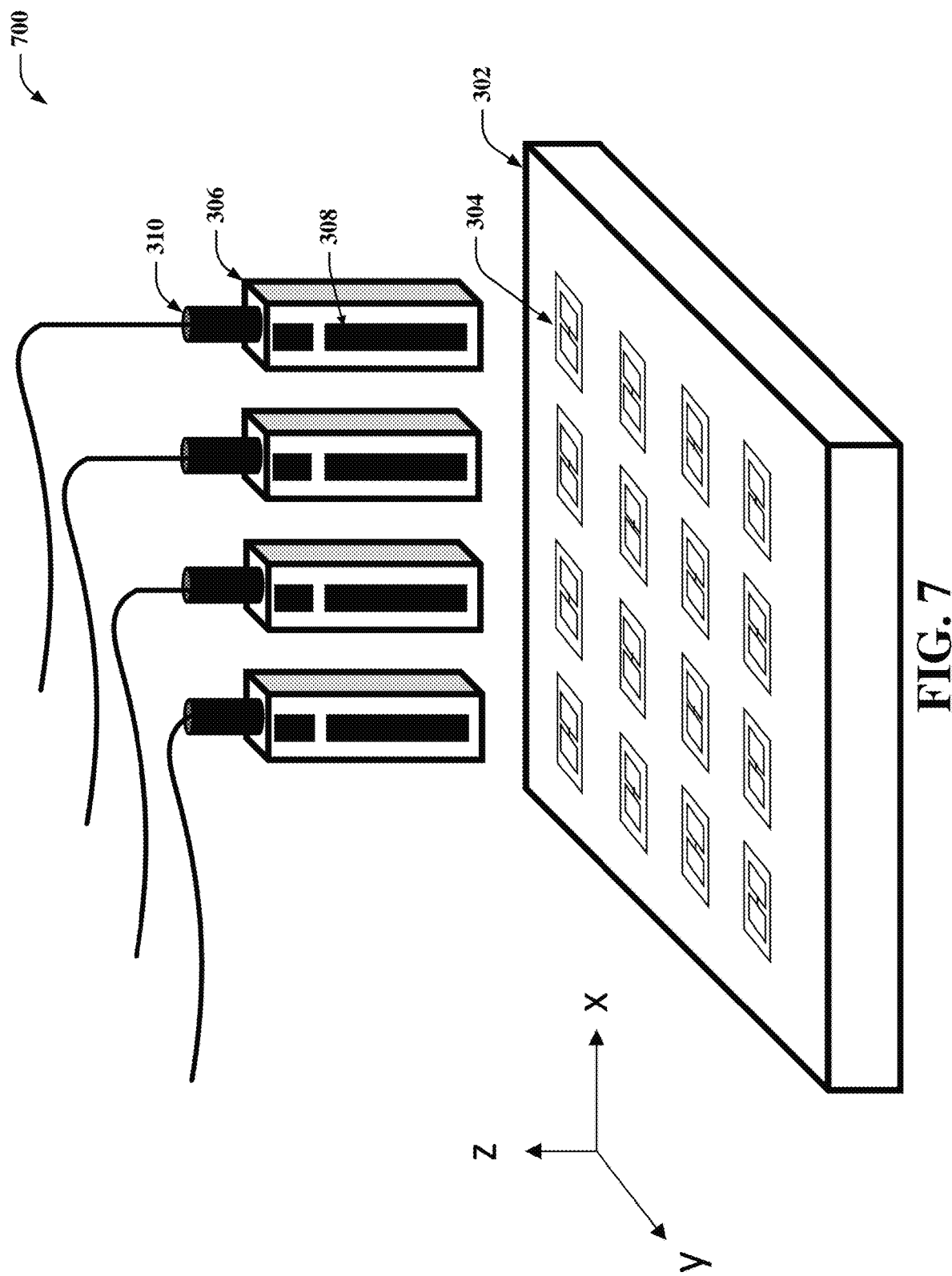
FIG. 7 illustrates a diagram of an example, non-limiting system that can facilitate contactless screening of a qubit in accordance with one or more embodiments described herein.

FIG. 7 illustrates a diagram of an example, non-limiting system 700 that can facilitate contactless screening of a qubit in accordance with one or more embodiments described herein. Repetitive description of like elements and/or processes employed in respective embodiments is omitted for sake of brevity.

System 700 can comprise an example, non-limiting alternative embodiment of system 300, system 400, system 500, and/or system 600. For example, system 700 can comprise an illustrative example of how multiple scanning probe devices 306 can be implemented using one or more components of contactless screening system 102 (e.g., scanner component 108, parameter extraction component 110, position component 202, etc.) in accordance with one or more embodiments of the subject disclosure described herein to scan (e.g., screen, probe, etc.) multiple qubits 304 of quantum device 302, for instance, simultaneously. In this example, such scanning of multiple qubits 304 of quantum device 302 can comprise establishing (e.g., via scanner component 108) the direct microwave coupling of multiple scanning probe devices 306 to respective qubits 304 to inspect such qubits 304 as described above (e.g., to determine qubit frequency and/or qubit energy relaxation time of each qubit 304 via parameter extraction component 110).

Figure 8:
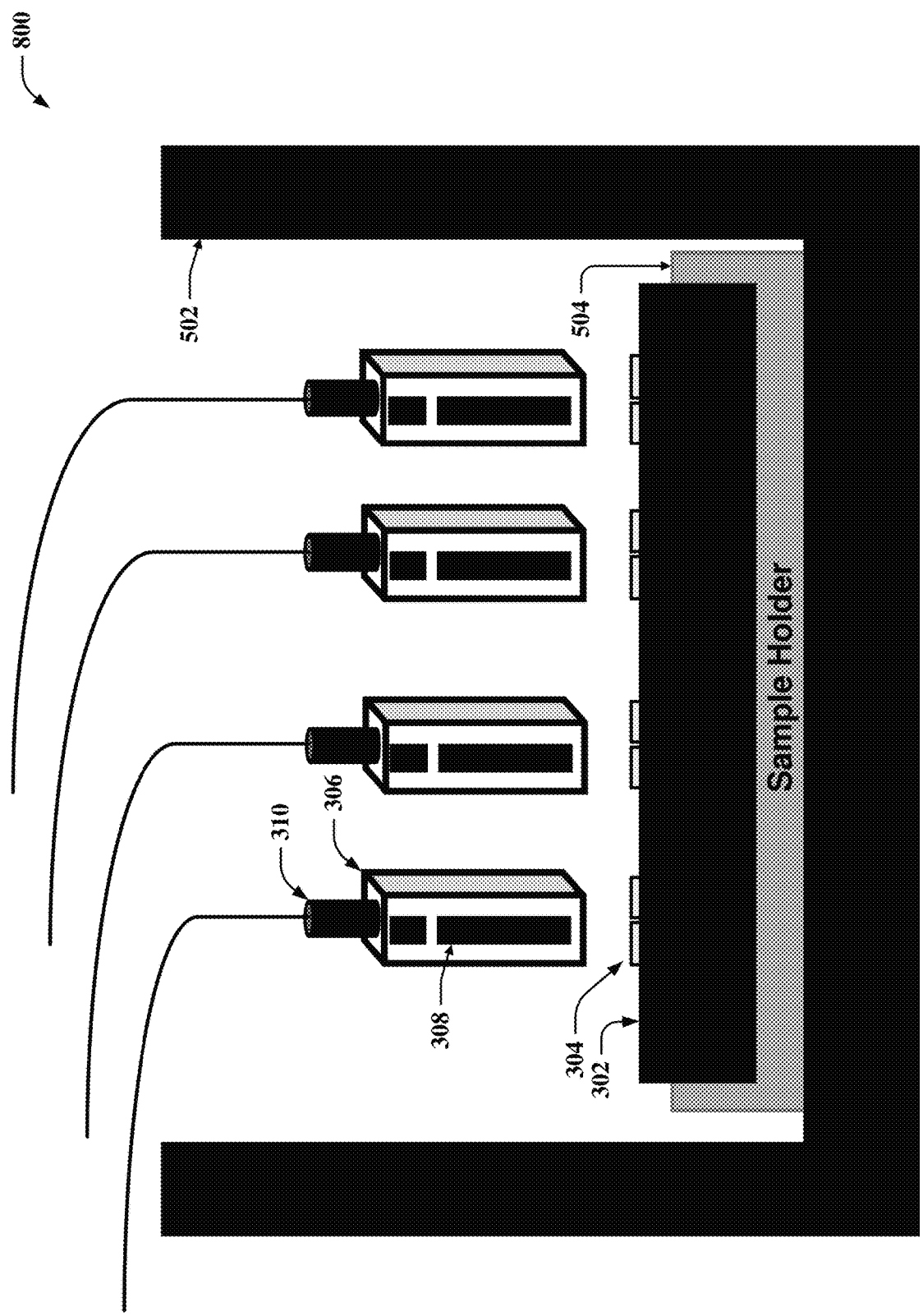
FIG. 8 illustrates a diagram of an example, non-limiting system that can facilitate contactless screening of a qubit in accordance with one or more embodiments described herein.

FIG. 8 illustrates a diagram of an example, non-limiting system 800 that can facilitate contactless screening of a qubit in accordance with one or more embodiments described herein. Repetitive description of like elements and/or processes employed in respective embodiments is omitted for sake of brevity.

System 800 can comprise an example, non-limiting alternative embodiment of system 300, system 400, system 500, system 600, and/or system 700. For example, system 800 can comprise an illustrative example of how multiple scanning probe devices 306 can be implemented inside cryostat device 502 using one or more components of contactless screening system 102 (e.g., scanner component 108, parameter extraction component 110, position component 202, etc.) in accordance with one or more embodiments of the subject disclosure described herein to scan (e.g., screen, probe, etc.) multiple qubits 304 of quantum device 302 inside cryostat device 502, for instance, simultaneously. In this example, such scanning of multiple qubits 304 of quantum device 302 can comprise establishing (e.g., via scanner component 108) the direct microwave coupling of multiple scanning probe devices 306 to respective qubits 304 inside cryostat device 502 to inspect such qubits 304 as described above (e.g., to determine qubit frequency and/or qubit energy relaxation time of each qubit 304 via parameter extraction component 110).

Contactless screening system 102 can be associated with various technologies. For example, contactless screening system 102 can be associated with quantum computer and/or hardware technologies (e.g., fixed frequency quantum processors), quantum computer and/or hardware inspection technologies, quantum computer and/or hardware testing technologies, qubit screening (e.g., scanning, probing, etc.) technologies, qubit frequency extraction technologies, qubit energy relaxation time extraction technologies, and/or other technologies.

Contactless screening system 102 can provide technical improvements to systems, devices, components, operational steps, and/or processing steps associated with the various technologies identified above. For example, contactless screening system 102 can facilitate contactless, non-invasive extraction of qubit frequency and/or qubit energy relaxation time of a qubit of a quantum device (e.g., a quantum processor on a chip). In another example, contactless screening system 102 can further facilitate contactless, non-invasive, and simultaneous extraction of qubit frequency and/or qubit energy relaxation time of respective qubits of a quantum device (e.g., a quantum processor on a chip) prior to packaging (e.g., prior to bump bonding), where contactless screening system 102 can perform such extraction while the quantum device is inside a cryostat device (e.g., as described above with reference to FIGS. 5 and 8), thereby reducing time to extract such qubit parameters.

Contactless screening system 102 can provide technical improvements to a processing unit (e.g., processor 106) associated with a classical computing device and/or a quantum computing device (e.g., a quantum processor, quantum hardware, superconducting circuit, etc.) associated with contactless screening system 102. For example, by reducing qubit parameter extraction time as described above, contactless screening system 102 can thereby reduce the processing time, the number of processing cycles, and/or computation costs of a processing unit (e.g., processor 106, a quantum processor, etc.) utilized by contactless screening system 102 to extract such qubit parameters in accordance with one or more embodiments of the subject disclosure described herein.

Contactless screening system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, etc.) to execute defined tasks related to the various technologies identified above. Contactless screening system 102 and/or components thereof, can be employed to solve new problems that arise through advancements in technologies mentioned above, employment of quantum computing systems, cloud computing systems, computer architecture, and/or another technology.

It is to be appreciated that contactless screening system 102 can utilize various combinations of electrical components, mechanical components, and circuitry that cannot be replicated in the mind of a human or performed by a human, as the various operations that can be executed by contactless screening system 102 and/or components thereof as described herein are operations that are greater than the capability of a human mind. For instance, the amount of data processed, the speed of processing such data, or the types of data processed by contactless screening system 102 over a certain period of time can be greater, faster, or different than the amount, speed, or data type that can be processed by a human mind over the same period of time.

According to several embodiments, contactless screening system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that contactless screening system 102 can include information that is impossible to obtain manually by an entity, such as a human user. For example, the type, amount, and/or variety of information included in contactless screening system 102, scanner component 108, parameter extraction component 110, and/or position component 202 can be more complex than information obtained manually by a human user.

Figure 9:
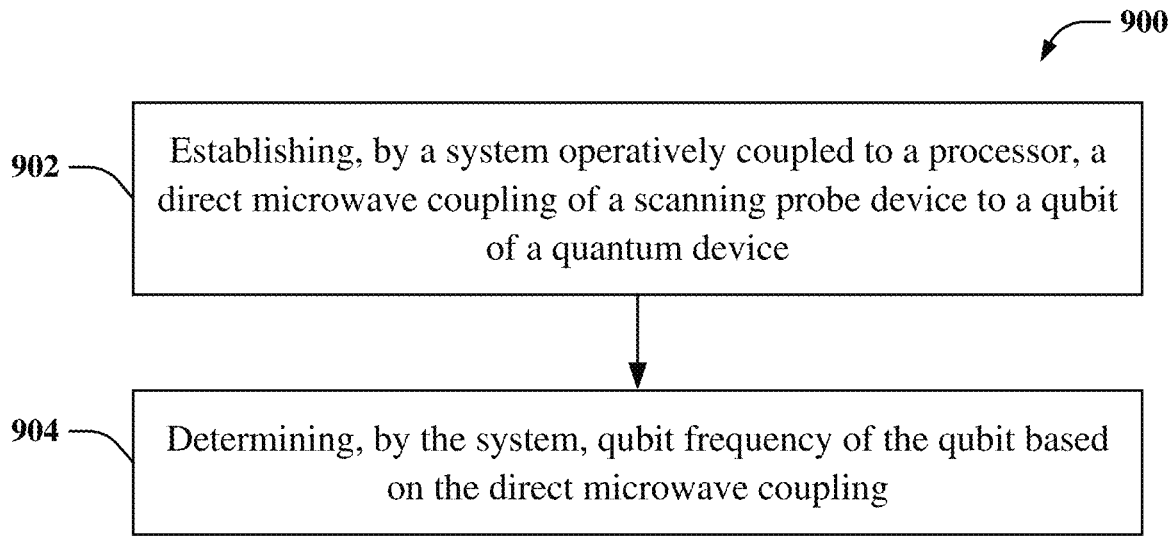
FIG. 9 illustrates a flow diagram of an example, non-limiting computer-implemented method that can facilitate q contactless screening of a qubit in accordance with one or more embodiments described herein.

FIG. 9 illustrates a flow diagram of an example, non-limiting computer-implemented method 900 that can facilitate contactless screening of a qubit in accordance with one or more embodiments described herein. Repetitive description of like elements and/or processes employed in respective embodiments is omitted for sake of brevity.

At 902, computer-implemented method 900 can comprise establishing, by a system (e.g., via contactless screening system 102 and/or scanner component 108) operatively coupled to a processor (e.g., processor 106, a quantum processor, etc.), a direct microwave coupling (e.g., contactless, non-invasive direct capacitive and/or inductive coupling via a microwave field) of a scanning probe device (e.g., scanning probe device 306 and/or microwave resonator 308) to a qubit (e.g., qubit 304) of a quantum device (e.g., quantum device 302).

At 904, computer-implemented method 900 can comprise determining, by the system (e.g., via contactless screening system 102 and/or parameter extraction component 110), qubit frequency of the qubit based on the direct microwave coupling.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
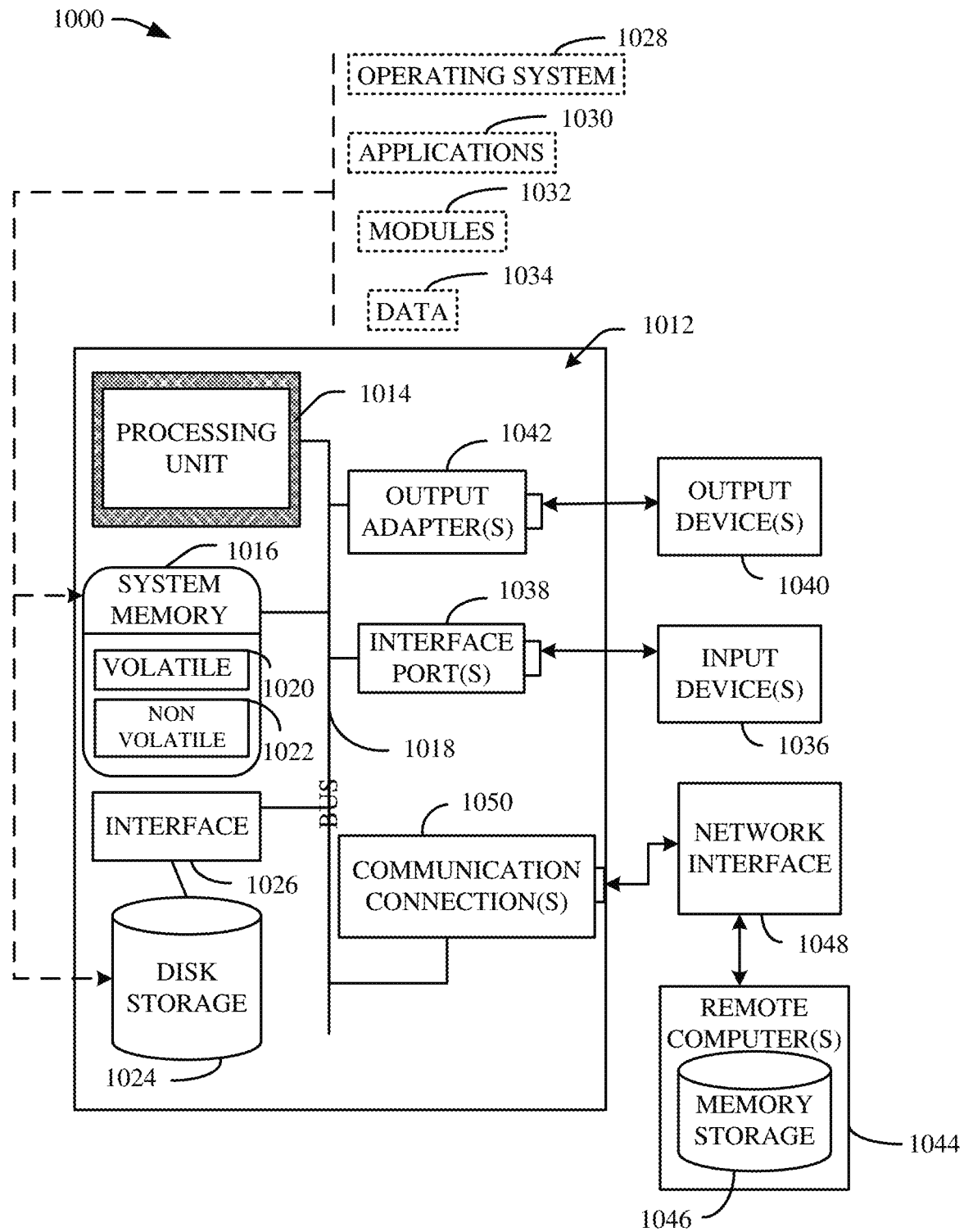
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a scanner component that establishes a direct microwave coupling of a scanning probe device to a qubit of a quantum device; and
a parameter extraction component that determines qubit frequency of the qubit based on the direct microwave coupling.

2. The system of claim 1, further comprising a microwave resonator coupled to the scanning probe device, wherein the scanner component couples the microwave resonator directly to the qubit using at least one of capacitive coupling or inductive coupling.

3. The system of claim 1, wherein the parameter extraction component further determines qubit energy relaxation time of the qubit based on the direct microwave coupling.

4. The system of claim 1, further comprising a microwave resonator coupled to the scanning probe device, wherein the parameter extraction component determines at least one of the qubit frequency or qubit energy relaxation time of the qubit based on a state dependent frequency shift of the microwave resonator.

5. The system of claim 1, wherein multiple scanning probe devices and the quantum device are located in a cryostat device, and wherein the scanner component establishes inside the cryostat device multiple direct microwave couplings of the multiple scanning probe devices to multiple qubits of the quantum device and the parameter extraction component determines at least one of qubit frequencies or qubit energy relaxation times of the multiple qubits based on the multiple direct microwave couplings.

6. The system of claim 1, wherein the computer executable components further comprise:
a position component that positions the scanning probe device a defined distance from the qubit to establish the direct microwave coupling of the scanning probe device to the qubit.

7. The system of claim 1, wherein the scanning probe device and the quantum device are located in a cryostat device, and wherein the scanner component establishes inside the cryostat device the direct microwave coupling of the scanning probe device to the qubit to inspect the qubit, thereby facilitating reduced time to extract the qubit frequency.

8. A computer-implemented method, comprising:
establishing, by a system operatively coupled to a processor, a direct microwave coupling of a scanning probe device to a qubit of a quantum device; and
determining, by the system, qubit frequency of the qubit based on the direct microwave coupling.

9. The computer-implemented method of claim 8, wherein the establishing comprises:
coupling, by the system, a microwave resonator of the scanning probe device directly to the qubit using at least one of capacitive coupling or inductive coupling.

10. The computer-implemented method of claim 8, further comprising:
determining, by the system, qubit energy relaxation time of the qubit based on the direct microwave coupling.

11. The computer-implemented method of claim 8, further comprising:
determining, by the system, at least one of the qubit frequency or qubit energy relaxation time of the qubit based on a state dependent frequency shift of a microwave resonator of the scanning probe device.

12. The computer-implemented method of claim 8, further comprising:
inserting, by the system, multiple scanning probe devices and the quantum device into a cryostat device;
establishing, by the system, inside the cryostat device multiple direct microwave couplings of the multiple scanning probe devices to multiple qubits of the quantum device; and
determining, by the system, at least one of qubit frequencies or qubit energy relaxation times of the multiple qubits based on the multiple direct microwave couplings.

13. The computer-implemented method of claim 8, further comprising:
positioning, by the system, the scanning probe device a defined distance from the qubit to establish the direct microwave coupling of the scanning probe device to the qubit.

14. The computer-implemented method of claim 8, further comprising:
inserting, by the system, the scanning probe device and the quantum device into a cryostat device; and
establishing, by the system, inside the cryostat device the direct microwave coupling of the scanning probe device to the qubit to inspect the qubit, thereby facilitating reduced time to extract the qubit frequency.

15. A computer program product facilitating a contactless screening of a qubit process, the computer program product comprising a computer readable storage medium having program instructions embodied therewith, the program instructions executable by a processor to cause the processor to:
establish, by the processor, a direct microwave coupling of a scanning probe device to a qubit of a quantum device; and
determine, by the processor, qubit frequency of the qubit based on the direct microwave coupling.

16. The computer program product of claim 15, wherein the program instructions are further executable by the processor to cause the processor to:
couple, by the processor, a microwave resonator of the scanning probe device directly to the qubit using at least one of capacitive coupling or inductive coupling.

17. The computer program product of claim 15, wherein the program instructions are further executable by the processor to cause the processor to:
determine, by the processor, qubit energy relaxation time of the qubit based on the direct microwave coupling.

18. The computer program product of claim 15, wherein the program instructions are further executable by the processor to cause the processor to:
determine, by the processor, at least one of the qubit frequency or qubit energy relaxation time of the qubit based on a state dependent frequency shift of a microwave resonator of the scanning probe device.

19. The computer program product of claim 15, wherein the program instructions are further executable by the processor to cause the processor to:
insert, by the processor, multiple scanning probe devices and the quantum device into a cryostat device;

establish, by the processor, inside the cryostat device multiple direct microwave couplings of the multiple scanning probe devices to multiple qubits of the quantum device; and determine, by the processor, at least one of qubit frequencies or qubit energy relaxation times of the multiple qubits based on the multiple direct microwave couplings.

20. The computer program product of claim 15, wherein the program instructions are further executable by the processor to cause the processor to:

insert, by the processor, the scanning probe device and the quantum device into a cryostat device; and establish, by the processor, inside the cryostat device the direct microwave coupling of the scanning probe device to the qubit to inspect the qubit.

* * * * *